Oct. 18, 1932.  H. MARLES  1,882,848
STEERING GEAR
Filed Jan. 7, 1929
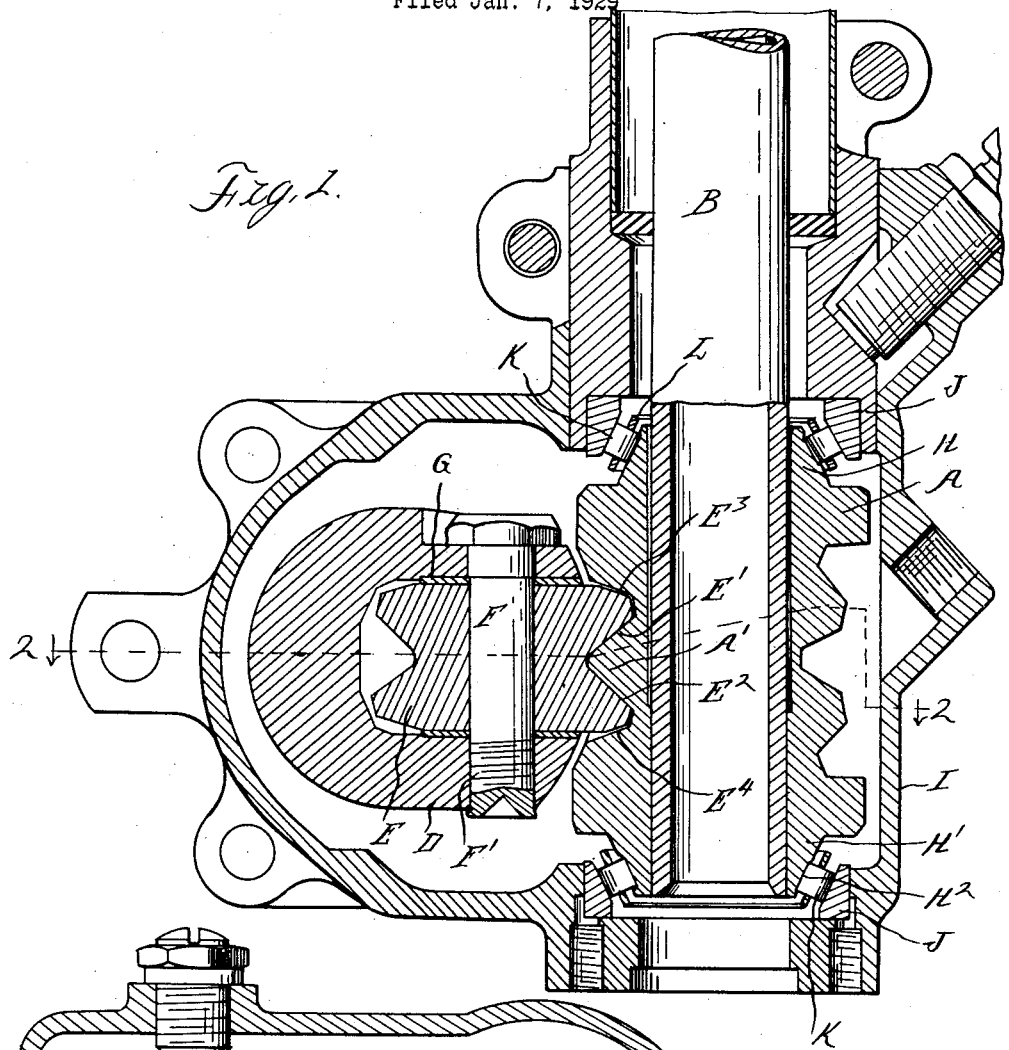
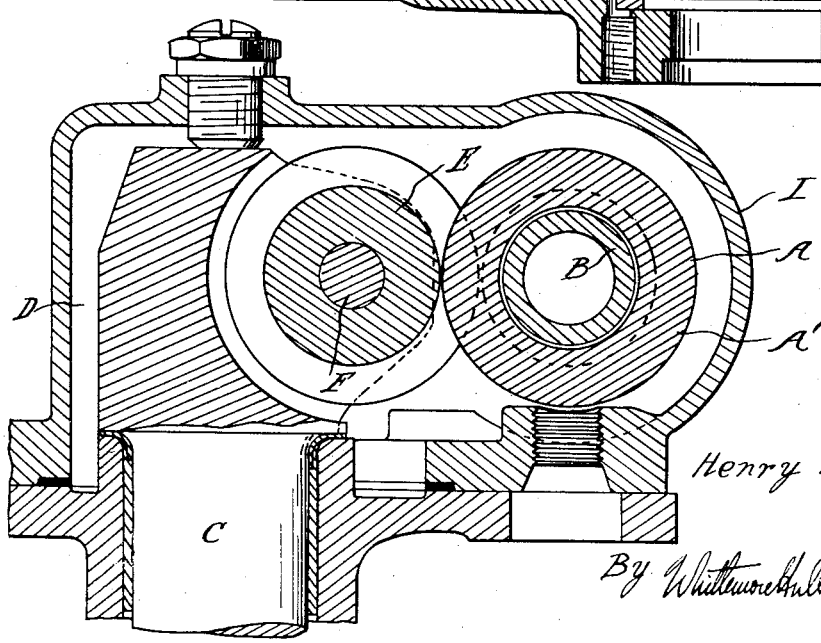
INVENTOR
Henry Marles
By Whittemore Hulbert Whittemore Belknap
ATTORNEYS Patented Oct. 18, 1932

1,882,848

UNITED STATES PATENT OFFICE

HENRY MARLES, OF DETROIT, MICHIGAN, ASSIGNOR, BY MESNE ASSIGNMENTS, TO GEMMER MANUFACTURING COMPANY, OF DETROIT, MICHIGAN, A CORPORATION OF MICHIGAN

STEERING GEAR

Application filed January 7, 1929. Serial No. 330,834.

In the present state of the art in steering gears, due to the general use of balloon tires and other changes in motor vehicle construction, the resistance to operation is greatly increased. This is particularly true in the parking of cars where the steering wheels must be turned with very little movement of the car. To overcome this difficulty, manufacturers have changed the gear ratios but there is a practical limit to such change, as it is undesirable to require too great turning of the steering wheel. It is therefore the object of the present invention to eliminate as far as possible the frictional resistance in the gearing so that all of the power is available in overcoming the resistance of ground wheels. To this end the invention consists, first, in the peculiar construction of rock shaft with roller teeth, further in the construction of anti-friction bearings, and further in the peculiar construction of parts as hereinafter set forth.

In the drawing:

Figure 1 is a central longitudinal section through the worm gearing;

Figure 2 is a cross section on line 2—2 of Figure 1, showing the roller rack in elevation.

Heretofore work gearings have been constructed in which the rock shaft is provided with a roller tooth to lessen the frictional resistance in operation. It has been found, however, difficult from a manufacturing standpoint to construct such a gearing with more than a single roller, while on the other hand the degree of movement required in the steering gear necessitates more than one tooth for engagement with the worm. In other words, as has been previously stated, the gear ratios which are now necessary in steering gears require a greater angular movement of the rockershaft than is possible with a single tooth.

To overcome this difficulty, I have devised a construction of roller rock shaft which while having but a single roller is nevertheless provided with a plurality of roller rack teeth that are successively brought into engagement with the worm. There is, however, only a single loaded surface of the roller which is in contact with the worm at any one time, which avoids any difficulty of differential surface speed.

As illustrated, A is the worm mounted upon the steering shaft B and C is the rock shaft to be actuated. Upon this rock shaft is formed a bifurcated head D for receiving a roller E arranged symmetrically with respect to an axial plane of the rock shaft C. The roller is mounted on a pin F which extends through the furcations of the head and has threaded end portion F' for engaging the correspondingly threaded bearing in one of said furcations. G are thrust bearing washers or collars on opposite sides of the roller and between the same and the furcations of the head.

The roller E is centrally grooved to form oppositely angling surfaces E' and E² which embrace a male thread A' formed on the worm A. This tread is developed by the movement of a notch cutter corresponding in cross section to the notch in the roller E and rotating about an axis corresponding to the axis of the shaft C simultaneously with the rotation of the work about its axis. This results in a worm of hour glass form and one in which the thread A' will fit the notch in the roller E in every position of adjustment within its angular range.

The amount of angular movement which may thus be transmitted from the worm to the rock shaft C before the loaded surface E' or E² passes out of engagement with the thread A' is not as great as is necessary for the operation of the steering gear. Therefore I form the portions of the roller E which are on opposite sides of the groove with external surfaces E³ and E⁴ which normally clear the worm thread but which come in contact therewith slightly in advance of the leaving contact of the correspondingly facing surfaces E' or E². Thus in effect the complete operation of the worm gearing is through the engagement of a male thread on the worm with a female thread on the roller during the central angular movement of the latter, and by the engagement of a male thread on the roller with a female thread in the worm during extremes of angular movement. The result is that but a single loaded surface on the roller is in action at any one time.

A further feature of my improvement is the means employed for holding the worm to its correct axis and at the same time largely eliminating bearing friction. With certain constructions ball bearings have been employed upon the worm shaft but on account of the high pressure developed these are not satisfactory.

With my improved construction the worm A is formed with extensions H H' on opposite ends thereof which are of conical form and slightly grooved as indicated at H². The housing I in which the gearing is mounted is provided with suitable bearings for receiving conical race members J having their faces parallel to the faces of the grooves H² and K are cylindrical rollers which are mounted in a suitable cage L and are placed between the race members J and cones H H'. While it is true that from a theoretical standpoint the rollers should be tapered, this factor may be neglected as in the limited angular movement of the work and the slow speed at which it is moved, the cylindrical rollers will be entirely satisfactory. On the other hand, the use of cylindrical rolls as distinguished from tapered rolls has a distinct advantage in that it largely eliminates end thrust on the rolls and simplifies the manufacture.

With the construction as described, in operation the internal frictional resistance of the worm gearing is reduced to the minimum so that all of the power is available to the overcoming of resistance to the turning of the ground wheels.

What I claim as my invention is:

1. In a steering gear, a worm, integral conical extensions on opposite ends of said worm, race members having surfaces parallel to the surface of said conical extension and cylindrical rollers arranged between said surfaces.

2. In a steering gear, the combination with a worm, of integral extensions on opposite ends of said worm grooved to present conical faces, race members having conical faces parallel to the faces of said work and cylindrical rollers interposed between the conical faces of said worm and race members.

3. In a steering gear, a worm having integral conical extensions on opposite ends thereof at an angle of less than forty-five degrees to the axis adapted to form race members for a roller bearing and also constituting centering means for the fashioning of the worm.

In testimony whereof I affix my signature.

HENRY MARLES.